(12) United States Patent
Jiang et al.

(10) Patent No.: US 12,181,686 B2
(45) Date of Patent: Dec. 31, 2024

(54) OPTICAL DISPLAY DEVICE AND AR DISPLAY DEVICE

(71) Applicant: HANGZHOU LINGBAN TECHNOLOGY CO. LTD., Hangzhou (CN)

(72) Inventors: Chaoqun Jiang, Hangzhou (CN); Pengbo Chen, Hangzhou (CN); Hui Du, Hangzhou (CN)

(73) Assignee: HANGZHOU LINGBAN TECHNOLOGY CO. LTD., Hangzhou (CN)

( * ) Notice: Subject to any disclaimer, the term of this patent is extended or adjusted under 35 U.S.C. 154(b) by 0 days.

(21) Appl. No.: 18/447,062

(22) Filed: Aug. 9, 2023

(65) Prior Publication Data
US 2024/0353688 A1    Oct. 24, 2024

(30) Foreign Application Priority Data
Apr. 24, 2023    (CN) .......................... 202310443709.8

(51) Int. Cl.
  *G02B 27/09*    (2006.01)
  *G02B 5/30*    (2006.01)
  *G02B 27/28*    (2006.01)

(52) U.S. Cl.
  CPC ....... *G02B 27/0972* (2013.01); *G02B 5/3083* (2013.01); *G02B 27/0955* (2013.01); *G02B 27/288* (2013.01)

(58) Field of Classification Search
  CPC .. G02B 27/01; G02B 27/0972; G02B 27/288; G02B 27/0955; G02B 27/017; G02B 27/0172; G02B 27/0176; G02B 27/0179; G02B 27/14; G02B 17/08; G02B 5/30;
  (Continued)

(56) References Cited

U.S. PATENT DOCUMENTS

| 6,222,677 | B1 | 4/2001 | Budd et al. |
| 6,487,021 | B1 | 11/2002 | Ophey |
| 9,063,331 | B2 | 6/2015 | Bohn et al. |

(Continued)

FOREIGN PATENT DOCUMENTS

| WO | WO-9800747 A1 * | 1/1998 | ......... G02B 27/0101 |
| WO | 2020045914 A1 | 5/2020 | |

OTHER PUBLICATIONS

English translation of WO 2020045914, (Year: 2020).*
(Continued)

*Primary Examiner* — Jie Lei
(74) *Attorney, Agent, or Firm* — Getech Law LLC; Jun Ye

(57) ABSTRACT

The present invention relates to the field of optical devices, and discloses an optical display device and an AR display device. The optical display device includes an image source, a first dispersive prism, a second dispersive prism, and a first lens. The image source is disposed on a side of a first surface of the first dispersive prism, and the first lens is fitted closely with a second surface of the first dispersive prism. A first surface of the second dispersive prism is fitted closely with a third surface of the first dispersive prism. The first surface of the first dispersive prism is on a side close to eyes of a wearer. A first half-transparent half-reflective film is disposed on a surface on a side of the first lens away from the first dispersive prism.

6 Claims, 4 Drawing Sheets

(58) Field of Classification Search
CPC .......... G02B 5/3083; G02B 2027/0118; G02B 2027/0174; G02B 2027/0178
USPC .................. 359/13, 629–634, 462, 466, 815; 345/7–9
See application file for complete search history.

(56) References Cited

U.S. PATENT DOCUMENTS

2021/0333557 A1    10/2021  Qin
2022/0066222 A1     3/2022  Qin

OTHER PUBLICATIONS

CN 202310443709.8, First Office Action and Search Report, mailed Jun. 5, 2023, 21 pages. (with English translation).
CN 202310443709.8, Notice of Allowance, mailed Jun. 29, 2023, 12 pages. (with English translation).

* cited by examiner

OPTICAL DISPLAY DEVICE AND AR DISPLAY DEVICE

TECHNICAL FIELD

The present invention relates to the field of optical devices, and in particular, to an optical display device and an AR display device.

BACKGROUND

An augmented reality (AR) display technology is implementing superposition display of virtual images on real scenes by using an optical element. Currently, optical devices that implement the AR display technology may be generally classified into two different types. In one type of optical device, projected light is projected into an optical waveguide by using a projection light engine, and the light is conducted through total reflection in the optical waveguide, and then is output to eyes, and in addition, ambient light may also be projected into the eyes by using the optical waveguide, so that superposition display of virtual images on real scenes is implemented. In the other type of optical device, projected light is conducted to eyes by using a geometric optical element, and ambient light may also be projected and incident into the eyes by using the geometric optical element, so that superposition display of virtual image on real scenes is implemented.

In the display device that implements the AR display technology by using the geometric optical element, how to implement lightening of a device structure is one of the hot research directions in the industry.

SUMMARY

The objective of the present invention is to provide an optical display device and an AR display device, which are simple in structure and implement lightening of overall structures to some extent.

To resolve the foregoing technical problem, the present invention provides an optical display device, including an image source, a first dispersive prism, a second dispersive prism, and a first lens.

The image source is disposed on a side of a first surface of the first dispersive prism, and the first lens is fitted closely with a second surface of the first dispersive prism. A first surface of the second dispersive prism is fitted closely with a third surface of the first dispersive prism. Both the first surface and the third surface of the first dispersive prism are located on a side of the first dispersive prism close to eyes of a wearer, and the second surface of the first dispersive prism is located on a side of the second dispersive prism away from the eyes of the wearer. A first half-transparent half-reflective film is disposed on a surface on a side of the first lens away from the first dispersive prism.

An included angle a between the second surface and the third surface of the first dispersive prism satisfies $15°<a<35°$, an included angle b between the first surface and a second surface of the second dispersive prism satisfies $15°<b<25°$, $a-b≤10°$, and the second surface of the second dispersive prism is a surface on a side on which projected light is output.

Projected light output by the image source is incident into the first dispersive prism through the first surface of the first dispersive prism, is incident into the first lens after being sequentially reflected totally by the second surface of the first dispersive prism, reflected by the third surface of the first dispersive prism, and transmitted by the second surface of the first dispersive prism, and is incident into the eyes after being reflected by the first half-transparent half-reflective film and sequentially transmitted and output by the second surface and the third surface of the first dispersive prism and the second dispersive prism.

Optionally, a polarizing film is disposed on the third surface of the first dispersive prism, and a quarter-wave plate is disposed between the first lens and the polarizing film; or a second half-transparent half-reflective film is disposed on the third surface of the first dispersive prism.

Optionally, each of the first dispersive prism and the second dispersive prism is a dispersive prism with a refractive index of 1.45-1.75 and an Abbe number of 18.0-60.0.

A focal length f1 of the first lens satisfies 10 mm≤f1≤25 mm, a refractive index of the first lens is 1.45-1.90, an Abbe number of the first lens is 35.0-85.0, a curvature radius R11 of a first surface of the first lens satisfies R11≥100 mm or R11≤−100 mm, and a curvature radius R12 of a second surface of the first lens satisfies 40 mm≤R12≤80 mm, where the first surface of the first lens is a surface on a side close to the first dispersive prism, and the second surface of the first lens is a surface on a side away from the first dispersive prism.

A gap between the first surface of the first lens and the second surface of the first dispersive prism is 0.01-1.0 mm.

Optionally, a second lens is further disposed between the image source and the first surface of the first dispersive prism.

Optionally, a focal length f2 of the second lens satisfies f2≥50 mm or f2≤−50 mm, a refractive index of the second lens is 1.45-1.90, an Abbe number of the second lens is 35.0-85.0, and a curvature radius R21 of a first surface and a curvature radius R22 of a second surface of the second lens satisfy |R21−R22|>50 mm, where the first surface of the second lens is a surface on a side away from the first dispersive prism, and the second surface of the second lens is a surface on a side close to the first dispersive prism.

A gap between the first surface of the second lens and the first surface of the first dispersive prism is 0.05-3.0 mm.

Optionally, a third lens is further disposed on a side of the second surface of the second dispersive prism, and the second surface of the second dispersive prism is a surface on which projected light is transmitted and output from the second dispersive prism.

Optionally, a focal length f3 of the third lens satisfies f3≥50 mm or f3≤−50 mm, a refractive index of the third lens is 1.45-1.90, an Abbe number of the third lens is 35.0-85.0, a curvature radius R31 of a first surface of the third lens satisfies R31≥100 mm or R31≤−100 mm, and a curvature radius R32 of a second surface of the third lens satisfies R32≥100 mm or R32≤−100 mm, where the first surface of the third lens is a surface on a side close to the second dispersive prism, and the second surface of the third lens is a surface on a side away from the second dispersive prism.

An AR display device is provided, and includes the optical display device according to any one of the foregoing implementations.

The present invention provides an optical display device and an AR display device. The optical display device includes an image source, a first dispersive prism, a second dispersive prism, and a first lens. The image source is disposed on a side of a first surface of the first dispersive prism, and the first lens is fitted closely with a second surface of the first dispersive prism. A first surface of the second dispersive prism is fitted closely with a third surface of the first dispersive prism. Both the first surface and the third surface of the first dispersive prism are located on a side of the second dispersive prism close to eyes of a wearer, and the second surface of the first dispersive prism is located on a side of the second dispersive prism away from the eyes of the wearer. A first half-transparent half-reflective film is disposed on a surface on a side of the first lens away from the first dispersive prism. An included angle a between the second surface and the third surface of the first dispersive prism satisfies 15°<a<35°, an included angle b between the first surface and a second surface of the second dispersive prism satisfies 15°<b<25°, a−b≤10°, and the second surface of the second dispersive prism is a surface on a side on which projected light is output. Projected light output by the image source is incident into the first dispersive prism through the first surface of the first dispersive prism, is incident into the first lens after being sequentially reflected totally by the second surface of the first dispersive prism, reflected by the third surface of the first dispersive prism, and transmitted by the second surface of the first dispersive prism, and is incident into the eyes after being reflected by the first half-transparent half-reflective film and sequentially transmitted and output by the second surface and the third surface of the first dispersive prism and the second dispersive prism.

In the optical display device provided in this application, the projected light output by the image source can be repeatedly reflected in the first dispersive prism through cooperation between the first dispersive prism and the first lens, so that a transmission optical path of the projected light can be repeatedly folded in the first dispersive prism to provide a sufficient transmission optical path for the projected light. In addition, the projected light needs to be reflected in the first dispersive prism only twice, to avoid a problem that a size of the first dispersive prism is excessively large due to an excessive quantity of reflection times while ensuring a sufficient optical path of the projected light, thereby facilitating lightening of a structure of the entire display device. In addition, because the first surface of the first dispersive prism is on a side close to the eyes of the wearer, and the image source outputs the projected light to the first surface of the first dispersive prism, the image source is placed on a side of the first dispersive prism close to the head of the wearer, to facilitate installation of the image source and simplify an installation structure of the image source. The optical display device provided in this application has a simple structure, and a size of the entire display device is relatively small. Therefore, lightening of the optical display device is implemented to some extent, to facilitate widespread application of the device.

BRIEF DESCRIPTION OF DRAWINGS

To describe the technical solutions in the embodiments of the present invention or in the existing technology more clearly, the following briefly describes the accompanying drawings needed for describing the embodiments or the existing technology. Clearly, the accompanying drawings in the following description merely show some embodiments of the present invention, and a person of ordinary skill in the art can still derive other drawings from these accompanying drawings without creative efforts.

DESCRIPTION OF EMBODIMENTS

To enable a person skilled in the art to better understand the solutions of the present invention, the following further describes the present invention in detail with reference to the accompanying drawings and specific implementations. Clearly, the described embodiments are merely some rather than all of the embodiments of the present invention. Based on the embodiments in the present invention, all other embodiments obtained by a person of ordinary skill in the art without creative efforts fall within the scope of protection of the present invention.

Figure 1:
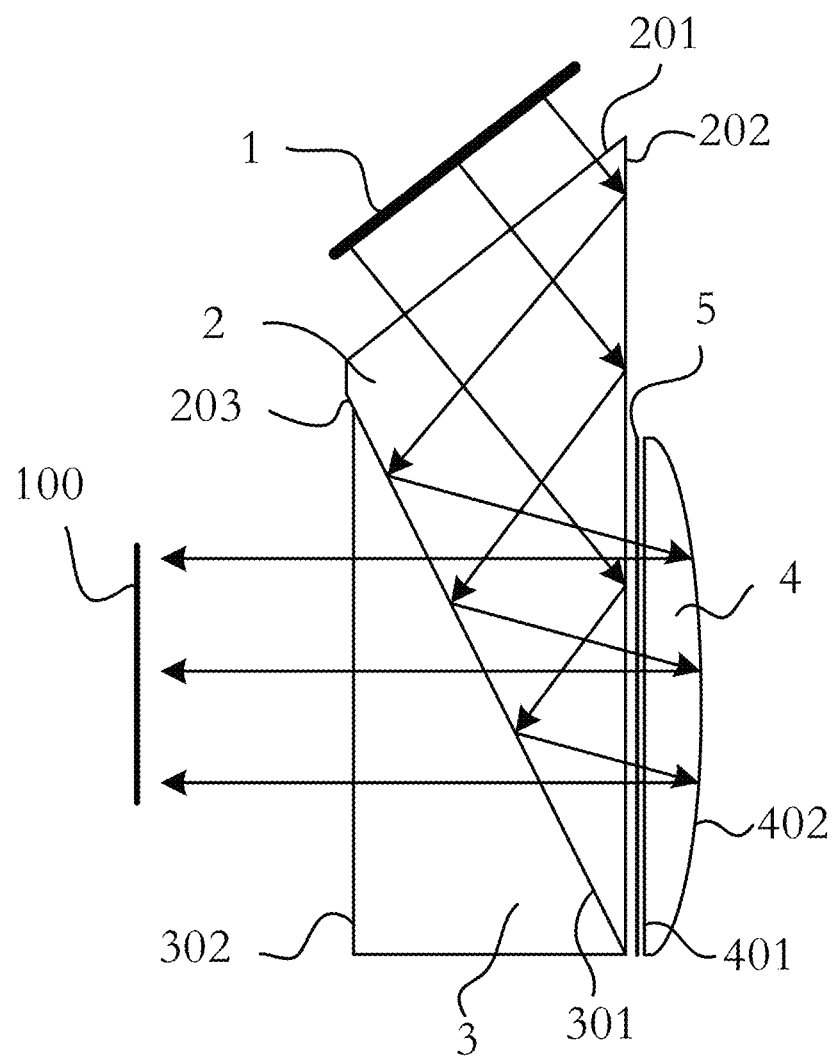
FIG. 1 is a schematic diagram of a structure of an optical display device according to an embodiment of this application.
Figure 2:
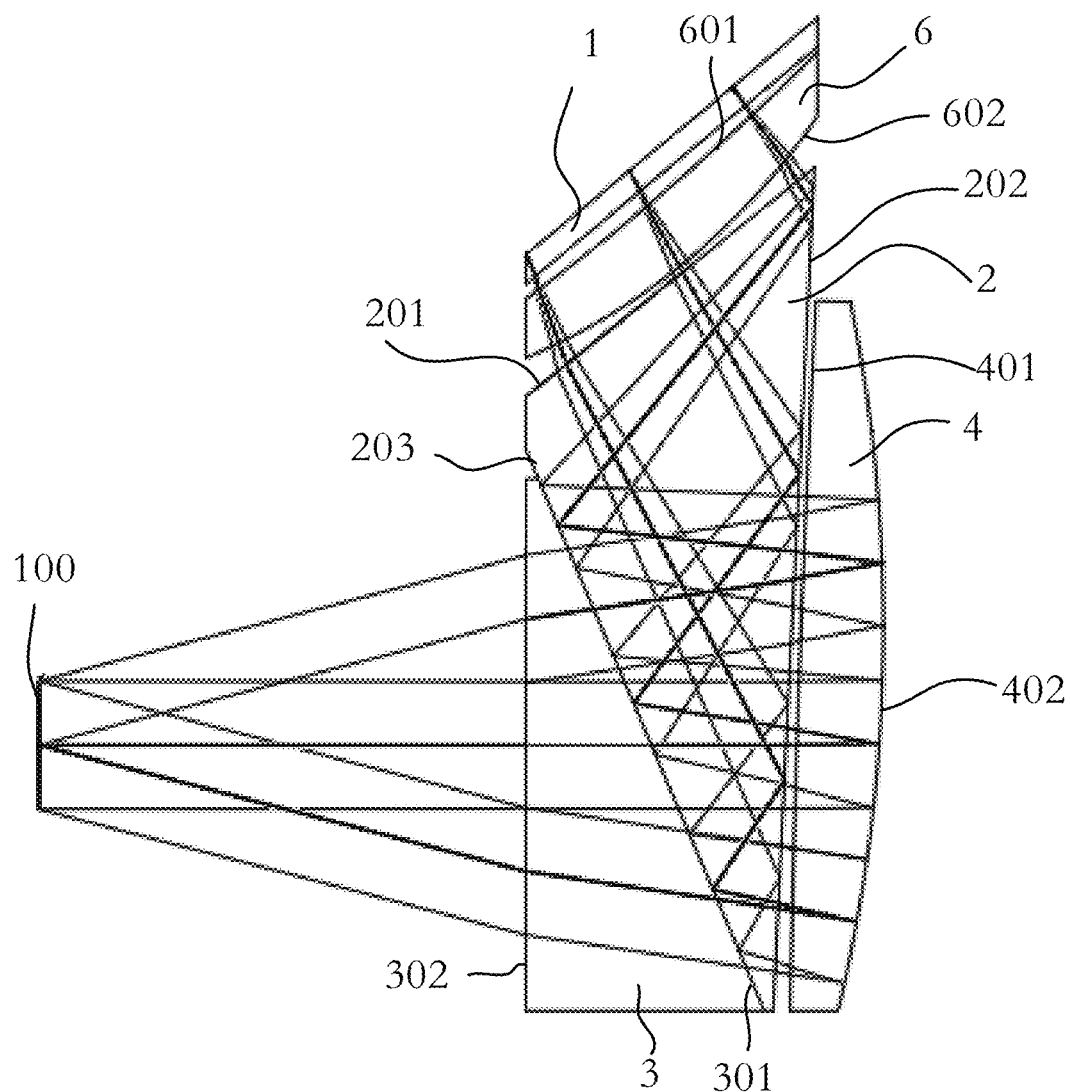
FIG. 2 is a schematic diagram of a structure of another optical display device according to an embodiment of this application.
Figure 3:
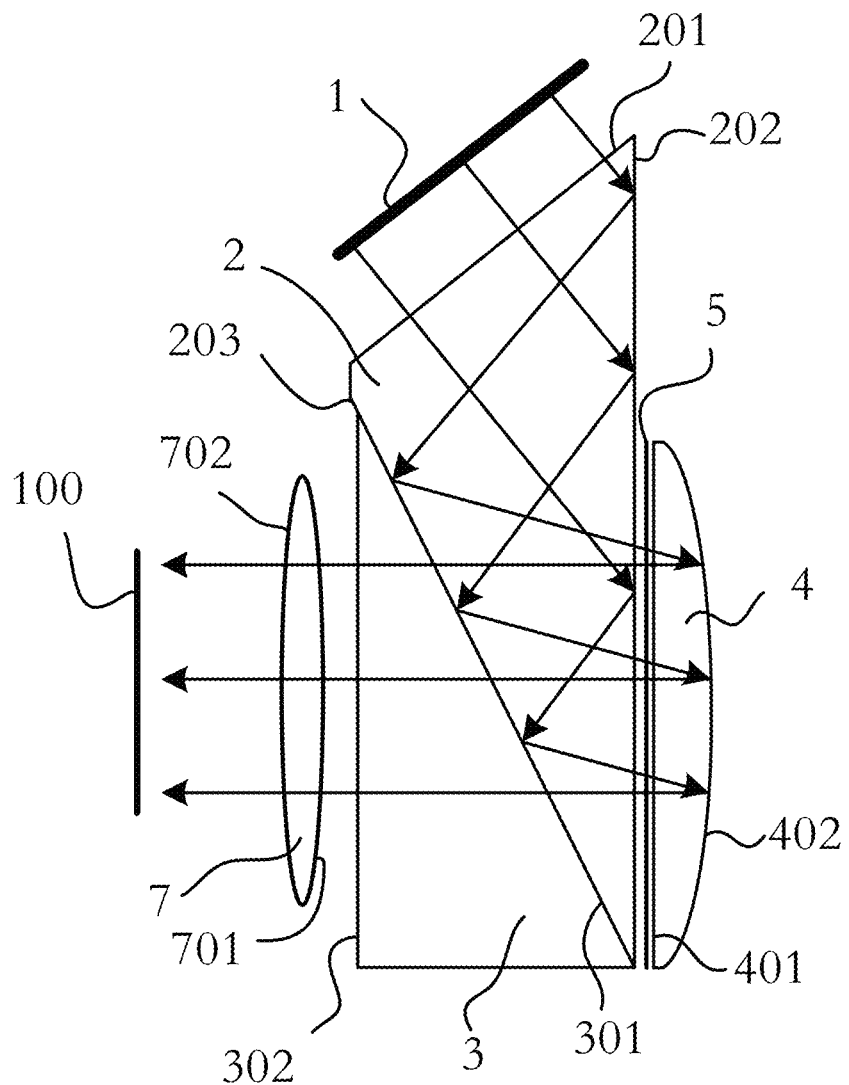
FIG. 3 is a schematic diagram of a structure of still another optical display device according to an embodiment of this application.
Figure 4:
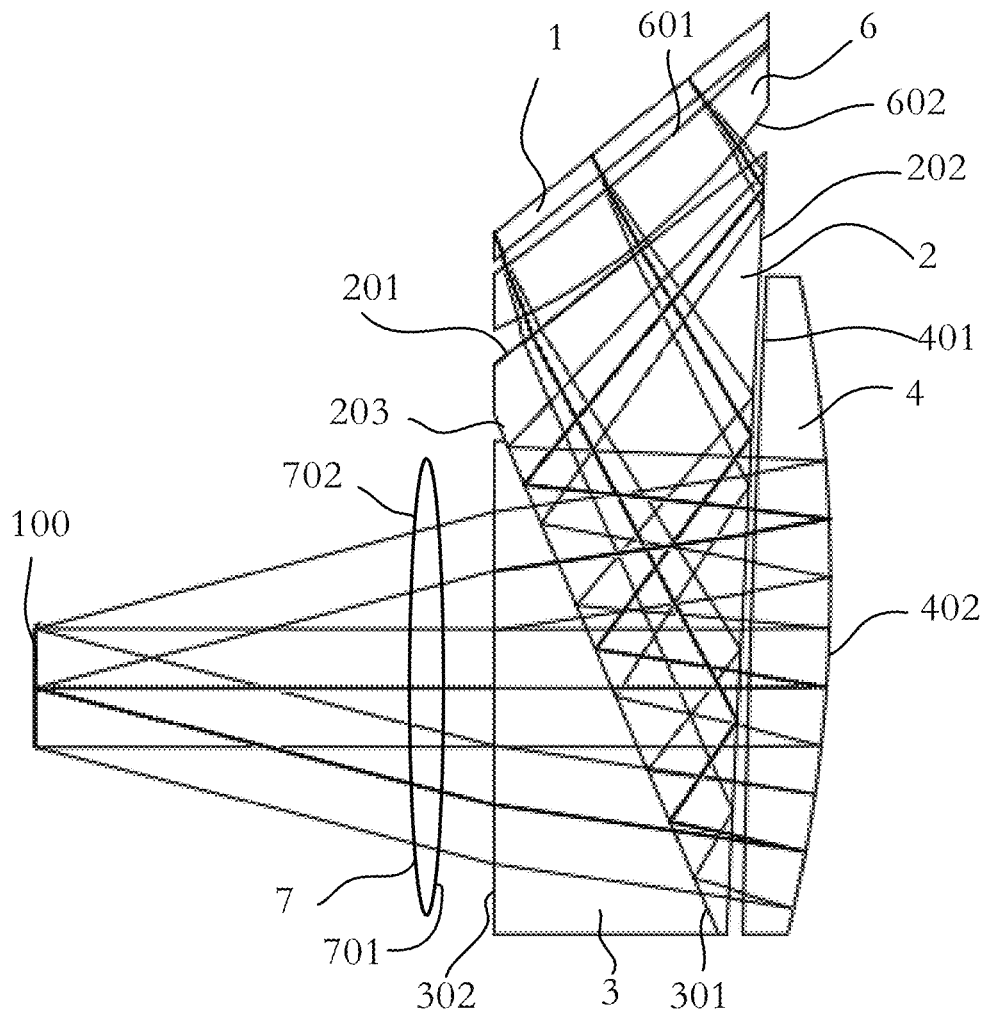
FIG. 4 is a schematic diagram of a structure of yet another optical display device according to an embodiment of this application.

As shown in FIG. 1 to FIG. 4, FIG. 1 is a schematic diagram of a structure of an optical display device according to an embodiment of this application, FIG. 2 is a schematic diagram of a structure of another optical display device according to an embodiment of this application, FIG. 3 is a schematic diagram of a structure of still another optical display device according to an embodiment of this application, and FIG. 4 is a schematic diagram of a structure of yet another optical display device according to an embodiment of this application.

In a specific embodiment of this application, the optical display device may include:

an image source 1, a first dispersive prism 2, a second dispersive prism 3, and a first lens 4.

The image source 1 is disposed on a side of a first surface 201 of the first dispersive prism 2, and the first lens 4 is fitted closely with a second surface 202 of the first dispersive prism 2. A first surface of the second dispersive prism is fitted closely with a third surface 203 of the first dispersive prism 2. Both the first surface 201 and the third surface 203 of the first dispersive prism 2 are located on a side of the first dispersive prism 3 close to eyes of a wearer, and the second surface 202 of the first dispersive prism 2 is located on a side of the second dispersive prism 3 away from the eyes of the wearer. A first half-transparent half-reflective film is disposed on a surface on a side of the first lens 4 away from the first dispersive prism 2.

An included angle a between the second surface 202 and the third surface 203 of the first dispersive prism 2 satisfies 15°<a<35°, an included angle b between the first surface 301 and a second surface 302 of the second dispersive prism 3 satisfies 15°<b<25°, a−b≤10°, and the second surface 302 of the second dispersive prism 3 is a surface on a side on which projected light is output.

Projected light output by the image source 1 is incident into the first dispersive prism 2 through the first surface 201 of the first dispersive prism 2, is incident into the first lens 4 after being sequentially reflected totally by the second surface 202 of the first dispersive prism 2, reflected by the third surface 203 of the first dispersive prism 2, and transmitted by the second surface 202 of the first dispersive prism 2, and is incident into the eyes after being reflected by the first half-transparent half-reflective film and sequentially transmitted and output by the second surface 202 and the third surface 203 of the first dispersive prism 2 and the second dispersive prism 3.

Referring to FIG. 1, in an embodiment shown in FIG. 1, the projected light output by the image source 1 is first incident into the first dispersive prism 2 after passing through the first surface 201 of the first dispersive prism 2, and then is incident onto the third surface 203 of the first dispersive prism 2 after reflected totally by the second surface 202 of the first dispersive prism 2. Because a polarizing film is disposed on the third surface 203 of the first dispersive prism 2, the projected light is partially reflected by the polarizing film, and projected light output after reflection is polarized light. The polarized light is transmitted to a side of the second surface 202 of the first dispersive prism 2 again, is transmitted and output from the second surface 202 of the first dispersive prism 2, and passes through a quarter-wave plate 5 for the first time, and then is incident into the first lens 4 through a first surface 401 of the first lens 4 and is reflected by the half-transparent half-reflective film on a second surface 402 of the first lens 4, so that the polarized light passes through the first surface 401 of the first lens 4 and the quarter-wave plate 5 for the second time and is incident into the first dispersive prism 2. Because the polarized light passes through the quarter-wave plate 5 twice, a polarization direction changes. When the polarized light is incident onto the third surface 203 of the first dispersive prism 2 on which the polarizing film is disposed, the polarized light can be directly transmitted. Therefore, the polarized light can be sequentially transmitted by the second surface 202 and the third surface 203 of the first dispersive prism 2 and then incident into the second dispersive prism 3, and can be output to an aperture 100 after being transmitted by the second dispersive prism 3. The aperture 100 is at a position of the eyes, in other words, the light output after being transmitted by the second dispersive prism 3 can be incident into the eyes.

When light reflected from the polarizing film to the first half-transparent half-reflective film is reflected to the polarizing film again, the light needs to be transmitted by the polarizing film. Therefore, a device that can change a polarization state of light needs to be disposed between the polarizing film and the first half-transparent half-reflective film. When the light passes through the device twice, the polarization state changes from "capable of being reflected by the polarizing film" to "capable of being transmitted by the polarizing film". In this embodiment, the quarter-wave plate 5 is selected to achieve the function. According to the foregoing principle, the quarter-wave plate 5 needs to be disposed between the polarizing film and the first half-transparent half-reflective film. In practice, the quarter-wave plate 5 may be attached to the polarizing film or the first half-transparent half-reflective film, or disposed between the first lens 4 and the first dispersive prism 2 or on one of adjacent surfaces of the first lens 4 and the first dispersive prism 2.

In the embodiment shown in FIG. 1, to enable the projected light to be partially transmitted and partially reflected when being incident onto the third surface of the first dispersive prism 2 for the first time, the polarizing film is disposed on the third surface 203 of the first dispersive prism 2, and the quarter-wave plate 5 is disposed between the polarizing film and the first half-transparent half-reflective film. However, in practice, the polarizing film may not be disposed on the third surface 203 of the first dispersive prism 2, and the quarter-wave plate 5 may not be disposed between the polarizing film and the first half-transparent half-reflective film. In another optional embodiment of this application, a second half-transparent half-reflective film may be further disposed on the third surface 203 of the first dispersive prism 2. In this case, the projected light can be partially reflected and partially transmitted when passing through the third surface 203 of the first dispersive prism 2 without disposing the quarter-wave plate 5.

In addition, the third surface 203 of the first dispersive prism 2 has a function of partially reflecting and partially transmitting incident light, and a ratio of reflected light to transmitted light depends on an angle of the incident light. Therefore, in practice, it is feasible to dispose neither of the polarizing film and the second half-transparent half-reflective film on the third surface 203 of the first dispersive prism 2.

It can be learned from the embodiment shown in FIG. 1 that, because in this embodiment, both the first surface 201 and the third surface 203 of the first dispersive prism 2 are located on the side of the second dispersive prism 3 close to the eyes of the wearer, the second surface 202 of the first dispersive prism 2 is located on the side of the second dispersive prism 3 away from the eyes of the wearer, and the image source 1 outputs the projected light to the first surface 201 of the first dispersive prism 2, the image source 1 is also located on the side of the first dispersive prism 2 close to the eyes. Compared with an image source 1 located on a side of a first dispersive prism 2 away from eyes, the image source 1 in this embodiment is easier to install, so that complexity of an installation structure of the image source 1 is reduced.

In addition, in this embodiment, the projected light is reflected only twice after being incident into the first dispersive prism 2, to avoid a problem that a volume of the first dispersive prism 2 is excessively large because the projected light is reflected for an excessive quantity of times while ensuring a sufficient optical path of the projected light. In addition, because the projected light is reflected in the first dispersive prism 2 only twice in this application, a degree of divergence of the projected light in the first dispersive prism 2 is not excessively large. Therefore, in this embodiment, an image source 1 that can output projected light with a larger area can be selected, in other words, projected light of an image with a larger area can be output, so that an image formed by the projected light output after being sequentially conducted by optical elements such as the first dispersive prism 2, the second dispersive prism 3, and the first lens 4 is large enough, and it is ensured that the image is little distorted due to divergence, thereby ensuring a display effect of the image. Therefore, in practice, an area of a light-emitting surface of the projected light output by the image source 1 may be set to be not less than a specified area size.

In addition, structures and shapes of the first dispersive prism 2 and the second dispersive prism 3 directly affect a space volume, an imaging effect, and the like of the entire optical display device.

For the first dispersive prism 2, neither of an excessively large included angle a between the second surface 201 and the third surface 203 of the first dispersive prism 2 and an excessively small included angle a between the second surface 201 and the third surface 203 of the first dispersive prism 2 can satisfy a requirement for emitting the projected light after the projected light is reflected in the first dispersive prism 2 twice. If the included angle a is excessively small, the projected light output by the image source 1 is reflected back and forth in the first dispersive prism 2 for a plurality of times, or a requirement for reflecting totally, on the second surface 201 of the first dispersive prism 2, the projected light output by the image source 1 cannot be satisfied. If the included angle a is excessively large, the projected light output by the image source 1 can be reflected in the first dispersive prism 2 only once before being emitted from the first dispersive prism 2, and a requirement for two times of reflection cannot be satisfied. Therefore, in this embodiment, the included angle a of the first dispersive prism 2 falls within an angle range of (15°, 35°), to ensure that a requirement of reflecting twice, in the first dispersive prism 2, the projected light output by the image source 1.

For the second dispersive prism 3, a main function of the second dispersive prism 3 is to compensate for an optical path difference generated after projection light output at different light-emitting positions on the image source 1 is repeatedly reflected in the first dispersive prism 1. If the included angle b between the first surface 301 and the second surface 302 of the second dispersive prism 3 is excessively small, the optical path difference cannot be compensated for. If the included angle b is excessively large, the optical path difference may be overcompensated for, and an optical path difference in a reverse direction is additionally caused, resulting in relatively large image distortion and affecting actual imaging quality. Therefore, in this embodiment, to ensure a compensation effect on the projected light and ensure imaging quality of the projected light, the included angle b is set to satisfy 15°<b<25°, and a−b≤10°. Specifically, some examples are given below.

| Examples | Value of a-b | distortion |
|---|---|---|
| 1 | 0 | 0.1% |
| 2 | 6 | 1% |
| 3 | 10 | 2.2% |

As the Examples 1-3 shows, when a-b gradually increases from 0 degree; the thickness of the module has less constraints on the image quality, and the distortion becomes higher; although the module may be easier to be thinner; but the asymmetry of the image will become larger (possibly It will become a trapezoid, etc.); when it reaches a certain level, the asymmetry of the image will in turn restrict the image quality; until it is greater than 10 degree, the image quality is basically unacceptable. It can be seen that the limitation of a−b≤10 degree can ensure a better display effect of the projected picture.

The first lens 4 in this embodiment can reflect the projected light, and can also perform aberration correction on the projected light.

In addition, it can be learned based on the embodiments shown in FIG. 1 to FIG. 4 that there is a difference between optical paths obtained after projection light output at different positions on the image source 1 is separately reflected by two surfaces of the first dispersive prism 2. Therefore, in this embodiment, the second dispersive prism 3 is further fitted closely with a side of the third surface 203 of the first dispersive prism 2, to adjust optical paths of projected light output at different positions, so that the optical paths of the projection light are basically the same, thereby reducing image distortion and ensuring a display effect of a projected image.

In each of the embodiments shown in FIG. 1 to FIG. 4, descriptions are provided by using an example in which the first surface 201, the second surface 202, and the third surface 203 of the first dispersive prism 2 are planes and the first surface 301 and the second surface 302 of the second dispersive prism 3 are also planes. However, in practice, the first surface 201, the second surface 201, and the third surface 203 of the first dispersive prism 2 may not be planes, and may be curved surfaces with an aberration correction function. Similarly, the first surface 301 and the second surface 302 of the second dispersive prism 3 may also be curved surfaces. Details are not described in this application.

In addition, to further improve a display effect of displaying a projected image by the entire optical display device, as shown in FIG. 2, in another optional embodiment of this application, a second lens 6 may be further disposed between the image source 1 and the first surface 201 of the first dispersive prism 2. The second lens 6 can further eliminate aberration of the projected light.

Certainly, eliminating the aberration of the projected light is not limited to the foregoing implementation. As shown in FIG. 3, in another optional embodiment of this application, a third lens 7 may be further disposed on the side of the second dispersive prism 3 on which projection light is output (a side of the second surface 302 of the second dispersive prism 3), in other words, on a side close to the eyes.

In addition, as shown in FIG. 4, in practice, the third lens 7 may be further disposed on the side of the second dispersive prism 3 close to the eyes while the second lens 6 is disposed between the image source 1 and the first dispersive prism 2, which can also implement the technical solution in this application.

Based on the foregoing descriptions, further considering that in an actual process of wearing and using the optical display device, the wearer may be near-sighted, and degrees of myopia of different wearers may be different, in another optional embodiment of this application, the following may be further included:

A relative distance between the image source 1 and the first surface 201 of the first dispersive prism 2 is adjustable, and a change amount of the relative distance is less than 2.5 mm.

An imaging position of the projected light may be adjusted by changing a position between the image source 1 and the first surface 201 of the first dispersive prism 2, so that the optical display device is adaptively worn and used by wearers with different degrees of myopia. In other words, in this embodiment, refractive diopter of the entire optical display device may be adjusted by changing the relative distance between the image source 1 and the first surface 201 of the first dispersive prism 2.

In practice, if a moving distance of the image source 1 relative to the first surface of the first dispersive prism 2 is excessively large, a boundary of the image source 1 close to the side of the eyes is closer to the eyes than the second surface 302 of the second dispersive prism 3. When the image source 1 works, relatively large heat is generated, and wearing discomfort is caused when the image source 1 is close to the eyes. In addition, because the moving distance of the image source 1 is excessively large, relatively large movable space needs to be reserved for motion of the image source 1, which causes a relatively large overall volume of the optical display device and is prone to cause wearing discomfort. In addition, image distortion and FOV reduction are serious. When the image source 1 moves to a range boundary, an edge of a display image may be incomplete and unclear, and an imaging effect can hardly be ensured. A maximum moving change amount of the image source 1 relative to the first surface of the first dispersive prism 2 may be equal to 2.5 mm, in other words, the moving change amount changes within a range of 0-2.5 mm, so that the refractive diopter of the entire optical display device can be adjusted within a range of 0-6 D, image distortion and FOV reduction can be reduced to some extent, and an image display effect can be improved.

For the embodiment in which the second lens 6 is disposed between the image source 1 and the first surface 201 of the first dispersive prism 2, the refractive diopter may also be adjusted by changing the distance of the image source 1 relative to the first dispersive prism 2. However, the refractive diopter may alternatively be changed by moving the second lens 6 or synchronously moving the image source 1 and the second lens 6 relative to the first dispersive prism 2. This is not limited in this embodiment.

For the optical display device that includes the third lens 7, the refractive diopter of the entire optical display device may also be adjusted by changing a distance of the third lens 7 relative to the second surface 302 of the second dispersive prism 3. Details are not described in this embodiment.

To further describe the optical display device in this application, the following describes specific structural parameters of the optical elements.

In a specific embodiment of this application, the following may be further included: The included angle a between the second surface 202 and the third surface 203 of the first dispersive prism 2 satisfies $15°<a<35°$, the included angle b between the first surface 301 and the second surface 302 of the second dispersive prism 3 satisfies $15°<b<25°$, $a-b\leq10°$, and the second surface 302 of the second dispersive prism 3 is a surface on a side on which projected light is output.

In addition, each of the first dispersive prism 2 and the second dispersive prism 3 may be a dispersive prism with a refractive index of 1.45-1.75 and an Abbe number of 18.0-60.0.

For the first lens 4, a focal length f1 may satisfy $10\text{ mm}\leq f1\leq 25\text{ mm}$, a refractive index may be 1.45-1.90, an Abbe number may be 35.0-85.0, a curvature radius R11 of the first surface 401 may satisfy $R11\geq100\text{ mm}$ or $R11\leq-100\text{ mm}$, and a curvature radius R12 of the second surface 402 may satisfy $40\text{ mm}\leq R12\leq 80\text{ mm}$. The first surface 401 of the first lens 4 is a surface on a side close to the first dispersive prism 2, and the second surface 402 of the first lens 4 is a surface on a side away from the first dispersive prism 2.

In addition, a gap between the first surface 401 of the first lens 4 and the second surface 202 of the first dispersive prism 2 is 0.01-1.0 mm.

As described above, the second lens 6 may be further disposed between the image source 1 and the first surface 201 of the first dispersive prism 2 in this application. For the second lens 6, specifically, a focal length f2 may satisfy $f2\geq50\text{ mm}$ or $f2\leq-50\text{ mm}$, a refractive index may be 1.45-1.90, an Abbe number may be 35.0-85.0, and a curvature radius R21 of a first surface 601 and a curvature radius R22 of a second surface 602 may satisfy $|R21-R22|>50\text{ mm}$. The first surface 601 of the second lens 6 is a surface on a side away from the first dispersive prism 2, and the second surface 602 of the second lens 6 is a surface on a side close to the first dispersive prism 2. A gap between the first surface 601 of the second lens 6 and the first surface 201 of the first dispersive prism 2 is 0.05-3.0 mm.

For the embodiment in which the second lens 6 is disposed between the image source 1 and the first surface 201 of the first dispersive prism 2, the refractive diopter may also be adjusted by changing the distance of the image source 1 relative to the first dispersive prism 2. The refractive diopter may alternatively be adjusted by moving the second lens 6 or synchronously moving the image source 1 and the second lens 6 relative to the first dispersive prism 2. This is not limited in this embodiment.

As described above, the second lens 6 may also have aberration correction and refraction sharing functions. Adding the second lens can improve imaging quality and reduce optical distortion.

In this embodiment, when positions of three optical elements such as the first dispersive prism 2, the second dispersive prism 3, and the first lens 4 remain fixed, if a position of the second lens 6 does not remain fixed, to change the refractive diopter of the entire optical display device, the refractive diopter can only be adaptively adjusted by moving the image source 1; or if the second lens 6 is movable, the refractive diopter can be adaptively adjusted by moving the image source 1 and/or the second lens 6 with a relatively small volume.

Certainly, moving only one of the image source 1 and the second lens 6 and moving both of the image source 1 and the second lens 6 cause different effects. When only the image source 1 or the second lens 6 is moved, a driving structure is simpler, and only a corresponding driving component needs to be configured. Correspondingly, image distortion and FOV reduction are relatively large, and consequently, an image edge may not be completely and clearly displayed.

When both the image source 1 and the second lens 6 are moved, higher relative stability during moving of the image source 1 and the second lens 6 is required, and higher stability and accuracy of a driving component are also required. The second lens 6 shares refraction, and an angle of light of the image source 1 that is transmitted by the second lens 6 is always consistent, so that image distortion and FOV reduction in the moving process can be reduced, and higher imaging quality in a refractive diopter adjustment process is ensured.

In the embodiment of this application in which the third lens 7 is disposed on the side of the second surface 302 of the second dispersive prism 3, the third lens 7 may be a lens whose focal length f3 satisfies $f3\geq50\text{ mm}$ or $f3\leq-50\text{ mm}$, whose refractive index is 1.45-1.90, and whose Abbe number is 35.0-85.0, that has a first surface 701 whose curvature radius R31 satisfies $R31\geq100\text{ mm}$ or $R31\leq-100\text{ mm}$, and that has a second surface 702 whose curvature radius R32 satisfies $R32\geq100\text{ mm}$ or $R32\leq-100\text{ mm}$. The first surface 701 of the third lens 7 is a surface on a side close to the second dispersive prism 3, and the second surface 702 of the third lens 7 is a surface on a side away from the second dispersive prism 3.

For the optical display device that includes the third lens 7, the refractive diopter of the entire optical display device may also be adjusted by changing a distance of the third lens 7 relative to the second surface 302 of the second dispersive prism 3.

In each of the foregoing embodiments of moving the image source 1 and/or the second lens 6, only the refractive diopter can be adjusted for the projected imaging light of the image source 1, and the refractive diopter is not adjusted for external ambient light seen by the eyes.

For the optical display device on which the third lens 7 is disposed, not only the projected imaging light of the image source 1 enters the eyes through the third lens 7, but also external ambient light needs to enter the eyes through the third lens 7. Therefore, moving the third lens 7 can not only adjust the refractive diopter for the projected light entering the eyes, but also adjust the refractive diopter for the external ambient light, so that the wearer can clearly view both an image in an external environment and a projected image formed by the projected light output by the image source 1, thereby better implementing integration of virtual and real images, and avoiding eye fatigue and discomfort caused by frequent adjustment of a crystalline lens for switching between viewing the projected image and viewing the image in the external environment.

Table 1 shows a group of parameters corresponding to each optical element in the embodiment shown in FIG. 1.

TABLE 1

| Optical element | Curvature radius of a first surface | Curvature radius of a second surface | Curvature radius of a third surface | Refractive index | Abbe number |
|---|---|---|---|---|---|
| First dispersive prism | Infinity | Infinity | −289.59 | 1.72 | 25.4 |
| Second dispersive prism | Infinity | Infinity | — | 1.72 | 29.5 |
| First lens | 356.13 | −59.12 | — | 1.72 | 81.6 |

Based on an optical display device formed in Table 1, a geometric point spread function of each field of view is approximately 50 μm. Maximum distortion of a projected image is approximately 14.0%. An MTF of each field of view is greater than 0.1 when resolution is less than or equal to 24 LP/mm. Relative luminance at an entire image plane is greater than 80%, and light is uniform. It can be learned that the optical display device has relatively good imaging quality.

Table 2 shows a group of parameters corresponding to each optical element in the embodiment shown in FIG. 2.

TABLE 2

| Optical element | Curvature radius of a first surface | Curvature radius of a second surface | Curvature radius of a third surface | Refractive index | Abbe number |
|---|---|---|---|---|---|
| First dispersive prism | Infinity | Infinity | Infinity | 1.72 | 29.5 |
| Second dispersive prism | Infinity | Infinity | — | 1.72 | 29.5 |
| First lens | 610.15 | −51.73 | — | 1.50 | 81.6 |
| Second lens | −72.55 | −20.31 | — | 1.52 | 58.7 |

Based on an optical display device formed in Table 2, a geometric point spread function of each field of view is less than 50 μm. Maximum distortion of a projected image is approximately 9.5%, and overall distortion is relatively small. An MTF of each field of view of an imaging system is greater than 0.1 when resolution is less than or equal to 30 LP/mm. Relative luminance at an entire image plane of the imaging system is greater than 80%, and light is uniform.

TABLE 3

| Optical element | Curvature radius of a first surface | Curvature radius of a second surface | Curvature radius of a third surface | Refractive index | Abbe number |
|---|---|---|---|---|---|
| First dispersive prism | Infinity | Infinity | Infinity | 1.65 | 19.0 |
| Second dispersive prism | Infinity | Infinity | — | 1.65 | 19.0 |
| First lens | −6501.77 | −65.17 | — | 1.80 | 80.0 |
| Third lens | −193.18 | −109.49 | — | 1.80 | 63.2 |

Based on an optical display device formed in Table 3, a geometric point spread function of each field of view is less than 50 μm. Maximum distortion of a projected image is approximately 14.0%. An MTF of each field of view of an imaging system is greater than 0.1 when resolution is less than or equal to 30 LP/mm. Relative luminance at an entire image plane of the imaging system is greater than 80%, and light is uniform.

In conclusion, in this application, a transmission optical path of the projected light can be repeatedly folded in the first dispersive prism through cooperation between the first dispersive prism and the first lens, to provide a sufficient transmission optical path for the projected light. In addition, the projected light needs to be reflected in the first dispersive prism only twice, to avoid a problem that a size of the first dispersive prism is excessively large due to an excessive quantity of reflection times while ensuring a sufficient optical path of the projected light, thereby facilitating lightening of a structure of the entire display device. In addition, because the first surface of the first dispersive prism is on a side close to the eyes of the wearer, and the image source outputs the projected light to the first surface of the first dispersive prism, the image source is placed on a side of the first dispersive prism close to the head of the wearer, to facilitate installation of the image source and simplifies an installation structure of the image source. The optical display device provided in this application has a simple structure, and a size of the entire display device is relatively small, to facilitate widespread application of the device.

This application further provides an AR display device, including the optical display device described in any one of the foregoing embodiments.

It should be noted that relational terms such as first and second in this specification are merely used to distinguish one entity or operation from another entity or operation without necessarily requiring or implying any such actual relationship or order between such entities or operations. Moreover, the terms "include", "contain", or any other variant thereof are intended to cover a non-exclusive inclusion, so as to cover each and every elements inherent to a process, a method, an article, or a device. Without more constraints, an element preceded by "includes a . . . " does not preclude the existence of additional identical elements in the process, method, article, or device that includes the element. In addition, a part in the foregoing technical solutions provided in the embodiments of this application whose implementation principle is consistent with that of corresponding technical solutions in the existing technology is not described in detail to avoid repetitions.

Specific examples are used in this specification to describe the principle and implementations of the present invention. The foregoing embodiments are merely used to help understand the method and the core idea of the present invention. It should be noted that a person of ordinary skill in the art may further make some improvements and polishing to the present invention without departing from the principle of the present invention, and the improvements and polishing fall within the protection scope of the claims of the present invention.

What is claimed is:

1. An optical display device, comprising an image source, a first dispersive prism, a second dispersive prism, and a first lens, wherein
each of the first dispersive prism and the second dispersive prism is a dispersive prism with a refractive index of 1.45-1.75 and an Abbe number of 18.0-60.0;
a focal length f1 of the first lens satisfies 10 mm≤f1≤25 mm, a refractive index of the first lens is 1.45-1.90, an Abbe number of the first lens is 35.0-85.0, a curvature radius R11 of a first surface of the first lens satisfies R11≥100 mm or R11≤−100 mm, and a curvature radius R12 of a second surface of the first lens satisfies 40 mm≤R12≤80 mm, wherein the first surface of the first lens is a surface on a side close to the first dispersive prism, and the second surface of the first lens is a surface on a side away from the first dispersive prism; and a gap between the first surface of the first lens and the second surface of the first dispersive prism is 0.01-1.0 mm;

and the image source is disposed on a side of a first surface of the first dispersive prism, and the first lens is fitted closely with a second surface of the first dispersive prism; a first surface of the second dispersive prism is fitted closely with a third surface of the first dispersive prism; both the first surface and the third surface of the first dispersive prism are located on a side of the second first dispersive prism close to eyes of a wearer, and the second surface of the first dispersive prism is located on a side of the second dispersive prism away from the eyes of the wearer;

and a first half-transparent half-reflective film is disposed on a surface on a side of the first lens away from the first dispersive prism;

an included angle a between the second surface and the third surface of the first dispersive prism satisfies 15°<a<35°, an included angle b between the first surface and a second surface of the second dispersive prism satisfies 15°<b<25°, a−b≤10°, and the second surface of the second dispersive prism is a surface on a side on which projected light originating from the image source is output; and the projected light originating from the image source is incident into the first dispersive prism through the first surface of the first dispersive prism, is incident into the first lens after being sequentially reflected totally by the second surface of the first dispersive prism, reflected by the third surface of the first dispersive prism, and transmitted by the second surface of the first dispersive prism, and a part of the projected light originating from the image source is incident into the eyes after being reflected by the first half-transparent half-reflective film and sequentially transmitted and output by the second surface and the third surface of the first dispersive prism and the second dispersive prism.

2. The optical display device according to claim 1, wherein a polarizing film is disposed on the third surface of the first dispersive prism, and a quarter-wave plate is disposed between the first lens and the polarizing film; or a second half-transparent half-reflective film is disposed on the third surface of the first dispersive prism.

3. The optical display device according to claim 1, wherein a second lens is further disposed between the image source and the first surface of the first dispersive prism.

4. The optical display device according to claim 3, wherein a focal length f2 of the second lens satisfies f2≥50 mm or f2≤−50 mm, a refractive index of the second lens is 1.45-1.90, an Abbe number of the second lens is 35.0-85.0, and a curvature radius R21 of a first surface and a curvature radius R22 of a second surface of the second lens satisfy |R21−R22|>50 mm, wherein the first surface of the second lens is a surface on a side away from the first dispersive prism, and the second surface of the second lens is a surface on a side close to the first dispersive prism; and a gap between the first surface of the second lens and the first surface of the first dispersive prism is 0.05-3.00 mm.

5. The optical display device according to claim 1, wherein a third lens is further disposed on a side of the second surface of the second dispersive prism, and the second surface of the second dispersive prism is a surface on which projected light is transmitted and output from the second dispersive prism.

6. The optical display device according to claim 5, wherein a focal length f3 of the third lens satisfies f3≥50 mm or f3≤−50 mm, a refractive index of the third lens is 1.45-1.90, an Abbe number of the third lens is 35.0-85.0, a curvature radius R31 of a first surface of the third lens satisfies R31≥100 mm or R31≤−100 mm, and a curvature radius R32 of a second surface of the third lens satisfies R32≥100 mm or R32≤−100 mm, wherein the first surface of the third lens is a surface on a side close to the second dispersive prism, and the second surface of the third lens is a surface on a side away from the second dispersive prism.

* * * * *